United States Patent
Sugawara et al.

(10) Patent No.: US 6,303,071 B1
(45) Date of Patent: Oct. 16, 2001

(54) METHOD AND APPARATUS FOR PRODUCING A BLOW MOLDED ARTICLE

(75) Inventors: Minoru Sugawara, Ichihara; Katsuhiko Tada, Chiba; Tomoyuki Obara, Chiba; Koki Hirano, Chiba, all of (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/147,294

(22) PCT Filed: May 26, 1997

(86) PCT No.: PCT/JP97/01751

§ 371 Date: Apr. 2, 1999

§ 102(e) Date: Apr. 2, 1999

(87) PCT Pub. No.: WO97/45246

PCT Pub. Date: Dec. 4, 1997

(30) Foreign Application Priority Data

May 28, 1996 (JP) .................................................. 8-133491
Aug. 23, 1996 (JP) .................................................. 8-222141

(51) Int. Cl.[7] .......................... B29C 49/60; B29C 49/62; B29C 49/66
(52) U.S. Cl. ........................ 264/526; 264/528; 264/540; 425/526; 425/536
(58) Field of Search ................................. 425/526, 536; 264/526, 528, 521, 532, 540

(56) References Cited

U.S. PATENT DOCUMENTS

| | | | |
|---|---|---|---|
| 3,078,508 | * 2/1963 | Martin, Jr. ............................. | 425/526 |
| 3,488,801 | * 1/1970 | Havely ................................... | 425/526 |
| 3,505,442 | * 4/1970 | Culpepper ............................. | 425/526 |
| 4,481,163 | * 11/1984 | Ota et al. .............................. | 264/513 |
| 4,524,045 | * 6/1985 | Hayashi et al. ....................... | 264/521 |
| 4,550,007 | * 10/1985 | Ohtsu et al. ........................... | 264/521 |
| 4,617,077 | * 10/1986 | Giese et al. ........................... | 264/528 |
| 4,872,827 | * 10/1989 | Noda ...................................... | 425/526 |
| 5,695,710 | * 12/1997 | Chen, Sr. et al. .................... | 264/532 |

FOREIGN PATENT DOCUMENTS

| | | | |
|---|---|---|---|
| 56-13141 | * 2/1981 | (JP) | ........................................ 264/528 |
| 60-112419 | 6/1985 | (JP) | . |
| 4-336224 | 11/1992 | (JP) | . |
| 6-23754 | 2/1994 | (JP) | . |

\* cited by examiner

*Primary Examiner*—Robert Davis
(74) *Attorney, Agent, or Firm*—Oblon, Spivak, McClelland, Maier & Neustadt, P.C.

(57) ABSTRACT

Provided is a method for producing blow moldings having a relatively large size through blow molding by use of a simple facility. The method including the steps of feeding a melt parison of crystalline resin into the space between molds, clamping the molds, blowing a pressurized fluid into the interior of the parison so as to cause the parison to be into close contact with the inner surfaces of the molds and to solidify the parison, wherein, while the parison and the mold inner surfaces are in close contact, the temperature of inner surfaces of the molds is maintained at a temperature from a temperature 10° C. lower than the crystallization temperature of the crystalline resin to the melting point of the resin, and the parison is removed from the molds after the parison is cooled through introduction thereinto or discharge therefrom, during or after blowing-in of the pressurized fluid, of a cooling medium not higher than room temperature. An apparatus comprises a blow molding machine; a forming mold which is used in combination with the blow molding machine for producing a blow molding, the forming mold having degassing pores having a diameter of 100 μm or less in the surface of the mold at intervals (a pitch) of 50 mm or less; and means for introducing and discharging a cooling medium into or from a parison formed through the mold.

16 Claims, 2 Drawing Sheets

METHOD AND APPARATUS FOR PRODUCING A BLOW MOLDED ARTICLE

FIELD OF THE INVENTION

The present invention relates to a method and an apparatus for producing blow moldings by use of crystalline resin. Particularly, the method and apparatus for producing blow moldings according to the present invention provides excellent accuracy in transfer of the shape of a mold inner surface (hereinafter called "mold transferability") for a glossy surface, an embossed surface, and like surfaces, through employment of specific molding conditions, and remarkably shorten the molding cycle time.

BACKGROUND ART

Blow molding has conventionally been used in manufacture of different types of containers and similar articles due to its variety of advantages; it enables production of blow moldings under low pressure to thereby reduce the mold costs, and it improves the strength and rigidity per unit weight due to reduction in weight of moldings. Further, in recent years, blow molding of automobile parts such as bumpers, spoilers, and wheel caps has become of interest. Demands in this field include reduction of molding cycle time for large moldings such as bumpers, and development of a method of manufacturing moldings having excellent appearance such as high surface gloss and the like for spoilers and wheel caps.

In the case in which crystalline resins such as polypropylene resins and polyamide resins are used in manufacture of automobile parts, which require strength and rigidity, even if a mold having a mirror-polished mold inner surface is used, ordinary molding conditions cannot avoid occurrence of melt fractures, die lines, or pockmark-like patterns in resultant blow moldings due to inclusion of gas or crystallization. Thus, in blow molding of a crystalline resin, faithful transfer of mold inner surface can hardly be attained, making difficult the manufacture of blow moldings having excellent appearance in terms of surface gloss and the like.

Japanese Patent Publication (kokoku) No. 2-40498 describes a method for producing blow moldings having excellent surface gloss. According to the method, a parison having a great number of fine projections and depressions (depth: 2–100 $\mu$m) in its resin surface is set in molds which are mirror-polished to have a mirror surface of 0.5 S or less and heated to a temperature higher than the crystallization temperature of the resin; blow molding is carried out; and the molds are cooled to a temperature lower than the crystallization temperature. However, this method has disadvantages; surface conditions of a parison must be regulated, resins are limited to those suffering melt fracture upon molding, and molding cycle is long, thereby reducing productivity in manufacture of large moldings such as automobile parts.

In order to improve the surface properties of a blow molding formed of crystalline resin, a conceivable method is one in which a melt parison is used in blow molding and the mold temperature is maintained higher than the crystallization temperature of the crystalline resin when the parison and the molds are in close contact. This method inevitably prolongs the molding cycle. To solve this problem, there have been proposed various methods for effectively cooling the molds heated at a temperature higher than the crystallization temperature to thereby maintain the shape of the molded article. For example, the invention disclosed in Japanese Patent Publication (kokoku) No. 7-77728 is directed to a method in which a high-temperature oil and a low-temperature oil are used as heat media for regulating temperature of molds, and upon switching of the oils, the flow path of the heat media are air-blown. Another invention, which is disclosed in Japanese Patent Application Laid-Open (kokai) No. 6-226828, is directed to a molding method in which molds are heated by use of steam and cooled by use of water. However, these methods in which heating and cooling of molds are performed repeatedly require a plurality of media for heating and cooling, or regulation of temperature of molds over a wide range. Therefore, these methods still have room for improvement in view of the intricate equipment and operation involved. Moreover, repetition of heating and cooling may prevent successful reduction in cycle time of molding. Japanese Patent Application Laid-Open (kokai) No. 4-77231 discloses a blow molding method in which a parison formed of a soft resin containing a crystalline resin is fed into the space between molds, followed by clamping of the molds, and a fluid is pressure-blown into the interior of the parison so as to cause the parison to come into close contact with the mold inner surfaces to thereby carry out molding and cooling, wherein the temperature of the molds is maintained between a temperature in the vicinity of the temperature at which the crystallization rate of the crystalline resin is the highest and the melting point of the crystalline resin, and a fluid serving as a cooling medium is pressure-blown into and circulated within the interior of the parison under pressure. This method may be effective for reducing die lines or weld lines in the surface of a molding; however, for pressure-blowing a cooling medium this method uses two blowing needles of different pressures, and therefore, circulation of the cooling medium occurs only at the initial stage of cooling. Also, since the cooling medium is rapidly heated upon contact with the high-temperature parison, the cooling efficiency is not always satisfactory and thus the reduction in time of molding cycle is limited. Therefore, there remain problems for satisfactory application to production of large blow moldings.

Japanese Patent Application Laid-Open (kokai) No. 6-226829 discloses a method in which a liquid-nitrogen-vaporized gas is fed inside a parison through one of two high-pressure blow pins extending to the interior of the parison and the gas is discharged through the other blow pin, to thereby cool the parison while reducing the molding cycle. However, that patent application discloses no technical concept for attaining both the reduction of molding cycle time and the improvement of mold transferability by regulating the mold inner surface temperature in response to the crystallization temperature of the crystalline resin.

SUMMARY OF THE INVENTION

Under these technical circumstances, an object of the present invention is to provide a method and an apparatus for producing blow moldings weighing 500 g or more, especially large blow moldings weighing 1 kg or more, with a shortened molding cycle, at higher productivity, and with improved surface transfer of a glossy surface, an embossed surface, or the like.

The present inventors conducted careful studies on a method and an apparatus for producing blow moldings through use of crystalline resin, especially large blow moldings, which enables a shortening in molding cycle time and achievement of improved surface transfer of a glossy surface, an embossed surface, and the like. As a result, they found that the molding cycle time and the appearance of moldings are satisfactorily improved if temperature conditions of the mold inner surfaces—inner surfaces—of the molds (hereinafter referred to as "inner surfaces of molds" or "mold inner surfaces" for the sake of clarity) are properly determined so as to match the properties of the crystalline resin; if cooling of the interior of the parison is performed in a more efficient manner; and if fine pores having a specific diameter are formed at specific intervals in the mold inner surface, thus leading to completion of the present invention. Accordingly, the present invention provides a method and an apparatus for producing blow moldings through a blow molding method, which realizes excellent mold transferability and shortened cycle time of molding.

According to a first aspect of the present invention, there is provided a method of producing a blow molding, the method comprising the steps of feeding a melt parison of crystalline resin into the space between molds, clamping the molds, blowing a pressurized fluid into the interior of the parison so as to cause the parison to come into close contact with the inner surfaces of the molds and to solidify the parison, wherein, while the parison and the mold inner surfaces are in close contact, the temperature of inner surfaces of the molds is maintained at a temperature within the range from a temperature 10° C. lower than the crystallization temperature of the crystalline resin to the melting point of the crystalline resin, and the parison is removed from the molds after the parison is cooled through introduction thereinto or discharge therefrom, during or after blowing-in of the pressurized fluid, of a cooling medium those temperature is not higher than room temperature.

Preferably, the molds have degassing pores having a diameter of 100 μm or less in the surfaces of the molds at intervals (a pitch) of 50 mm or less.

According to a second aspect of the present invention, there is provided an apparatus for the production of a blow molding, which apparatus includes a blow molding machine; a forming mold which is used in combination with the blow molding machine for producing a blow molding, the forming mold having degassing pores having a diameter of 100 μm or less in the surface of the mold at intervals (a pitch) of 50 mm or less; and means for introducing and discharging a cooling medium into or from a parison formed through the mold.

BRIEF DESCRIPTION OF THE DRAWINGS

FIGS. 1 and 2 are sectional views showing an embodiment of the method and apparatus for producing blow moldings according to the present invention, wherein FIG. 1 shows steps of mold opening and parison feeding; and FIG. 2 shows steps of clamping, molding, and cooling.

BEST MODE FOR CARRYING OUT THE INVENTION

Figure 1:
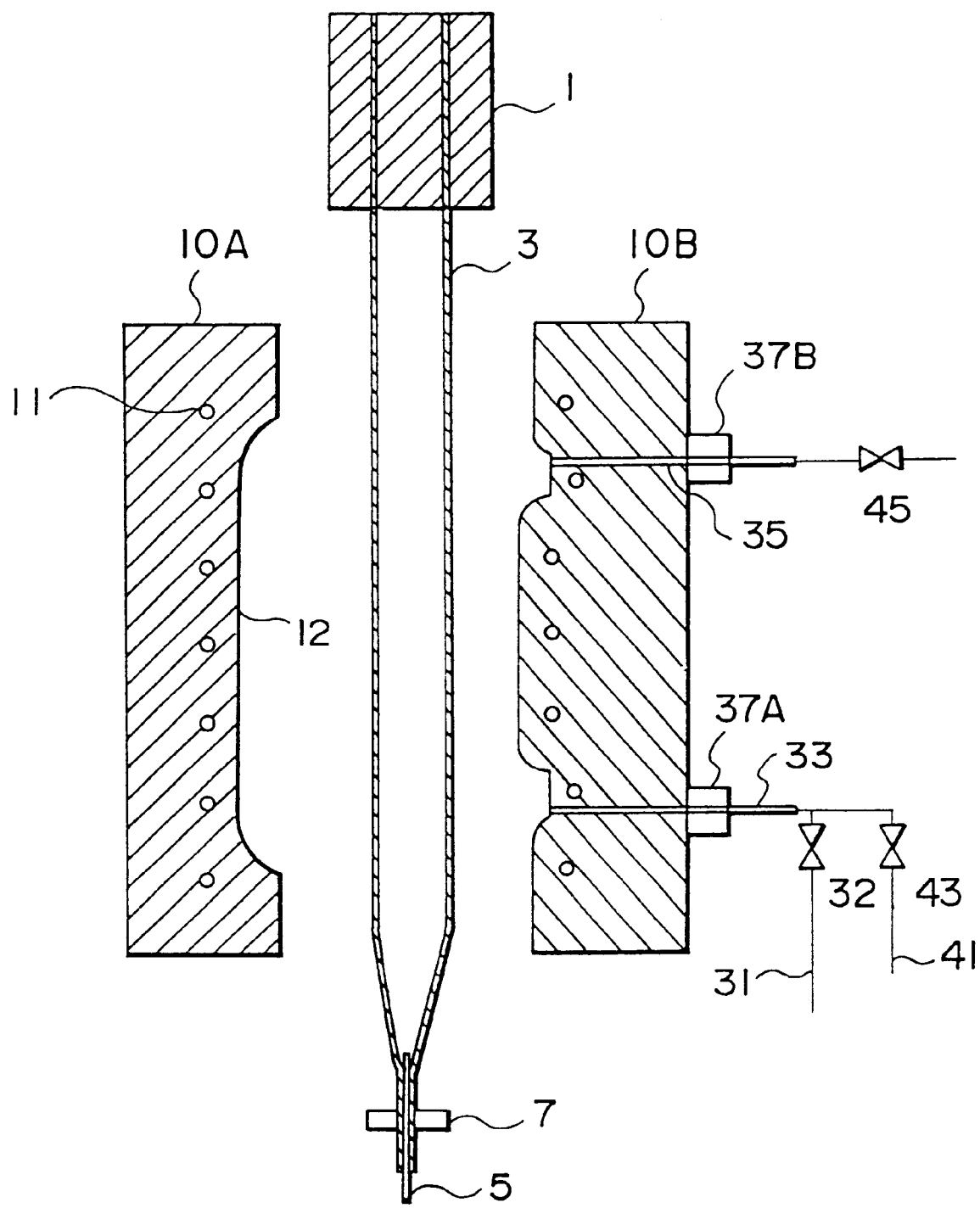

Embodiments of the present invention will next be described.

Crystalline resins which are used in the production method of the present invention are not particularly limited; there may be used polyolefin resins, polyamide resins, polyester resins, and polyacetal resins. Examples of polyolefin resins include homopolymers of α-olefins such as ethylene, propylene, butene-1, 3-methylbutene-1, 3-methylpentene-1, and 4-methylpentene-1; copolymers of these α-olefins; and copolymers of these α-olefins and other unsaturated monopolymers that are copolymerizable therewith. Typical examples of polyolefin resins include high-, medium-, and low-density polyethylene resins, linear low-density polyethylenes, super molecular weight polyethylenes, ethylene-vinyl acetate copolymers, and ethylene-ethyl acrylate copolymers; polypropylene resins such as syndiotactic polypropylenes, isotactic polypropylenes, and propylene-ethylene random or block copolymers; and poly4-methylpentene-1.

Examples of polyamide resins include ring opening polymerization products of cyclic aliphatic lactums, such as 6-nylon and 12-nylon; polycondensation products of aliphatic diamine and aliphatic dicarboxylic acid, such as 6,6-nylon, 6,10-nylon, and 6,12-nylon; polycondensation products of aromatic diamine and aliphatic dicarboxylic acid, such as those between m-xylenediamine and adipic acid; polycondensation products of aromatic diamine and aromatic dicarboxylic acid, such as those between p-phenylenediamine and terephthalic acid and those between m-phenylenediamine and isophthalic acid; and polycondensation products of amino acids, such as 11-nylon.

Examples of polyester resins include polycondensation products of aromatic dicarboxylic acid and alkylene glycol, and specific examples include polyethylene terephthalate and polybutylene terephthalate.

Examples of polyacetal resins include homopolymers such as polyoxymethylene; and formaldehyde-ethylene oxide copolymers which are obtained from trioxan and ethylene oxide.

In the production method of the present invention, the above-mentioned crystalline resins may be used singly or in combination. Further, if necessary, other resins having low crystallinity, amorphous resins, elastomers mentioned below, inorganic fillers, and a variety of additives may be added to the crystalline resins. Of the listed thermoplastic resins, preferred are polypropylene resins such as polypropylene, block or random copolymers of propylene and other olefins, and mixtures of these copolymers. Polypropylene resins containing acid-modified polyolefin resins which have been modified with unsaturated carboxylic acids or their derivatives may also be used.

Preferably, polypropylene resins have a melt index MI (230° C., 2.16 kgf) of 0.1–2.0 g/10 min, more preferably 0.2–1.0 g/10 min, from the viewpoint of blow moldability including drawdown resistance. Further, moldability and the like can be improved through addition of a high density polyethylene resin having a melt index MI (190° C., 2.16 kgf) of 0.001–1 g/10 min, preferably 0.01–0.5 g/10 min, to a raw molding material in an amount of 0–30% by weight. Elastomers having a Mooney viscosity ($ML_{1+4}$ 100° C.) of 10–120 may also be added to the raw molding material, wherein the elastomers include ethylene-propylene copolymer elastomer, ethylene-propylene-diene copolymer elastomer, styrene-diene elastomer, or hydrogenated elastomers of these elastomers.

Moreover, inorganic fillers may be added to the raw molding material in an amount of 0–50% by weight in order to improve rigidity, strength, heat resistance, etc. of blow moldings. Specific examples of the inorganic fillers include talc, mica, calcium carbonate, glass fiber, carbon fiber, magnesium sulfate fiber, potassium titanate fiber, titanium dioxide fiber, magnesium oxysulfate fiber, and organic fiber. Of these materials, talc, mica, and glass fiber are preferably used. Further, if necessary, there may be added stabilizers, antistatic agents, weather-proof agents, flame retardants, pigments, dispersing agents, or crystal nucleation agents. Examples of the crystal nucleation agents include talc, alkali metal salts of organic carboxylic acid, basic polyvalent metal salts of cyclic phosphoric esters, aluminum 4-tert butyl benzoates, dibenzylidene sorbitols, and their derivatives.

In the production method of the present invention, the terms "crystallization temperature" and "melting point" refer not only to those of crystalline resins per se used in the present invention, but also to those of raw material resins which are actually subjected to blow molding and which contain, in addition to a crystalline resin, crystal nucleation agents for improving crystallinity, other thermoplastic resins, fillers such as talc, etc. In the case of a raw material for blow molding composed of two or more crystalline resins, measurements of crystallization temperature and melting point by differential scanning calorimetry (DSC) may show two or more peaks. In such a case, the highest crystallization temperature, the highest melting point, or the crystallization temperature and the melting point of the predominant resin component are employed as the crystallization temperature and melting point as defined in the present invention.

In the present invention, a blow molding machine is used to produce blow moldings from a crystalline resin which is selected in accordance with the use, shape, and size of the target blow molding.

Figure 2:
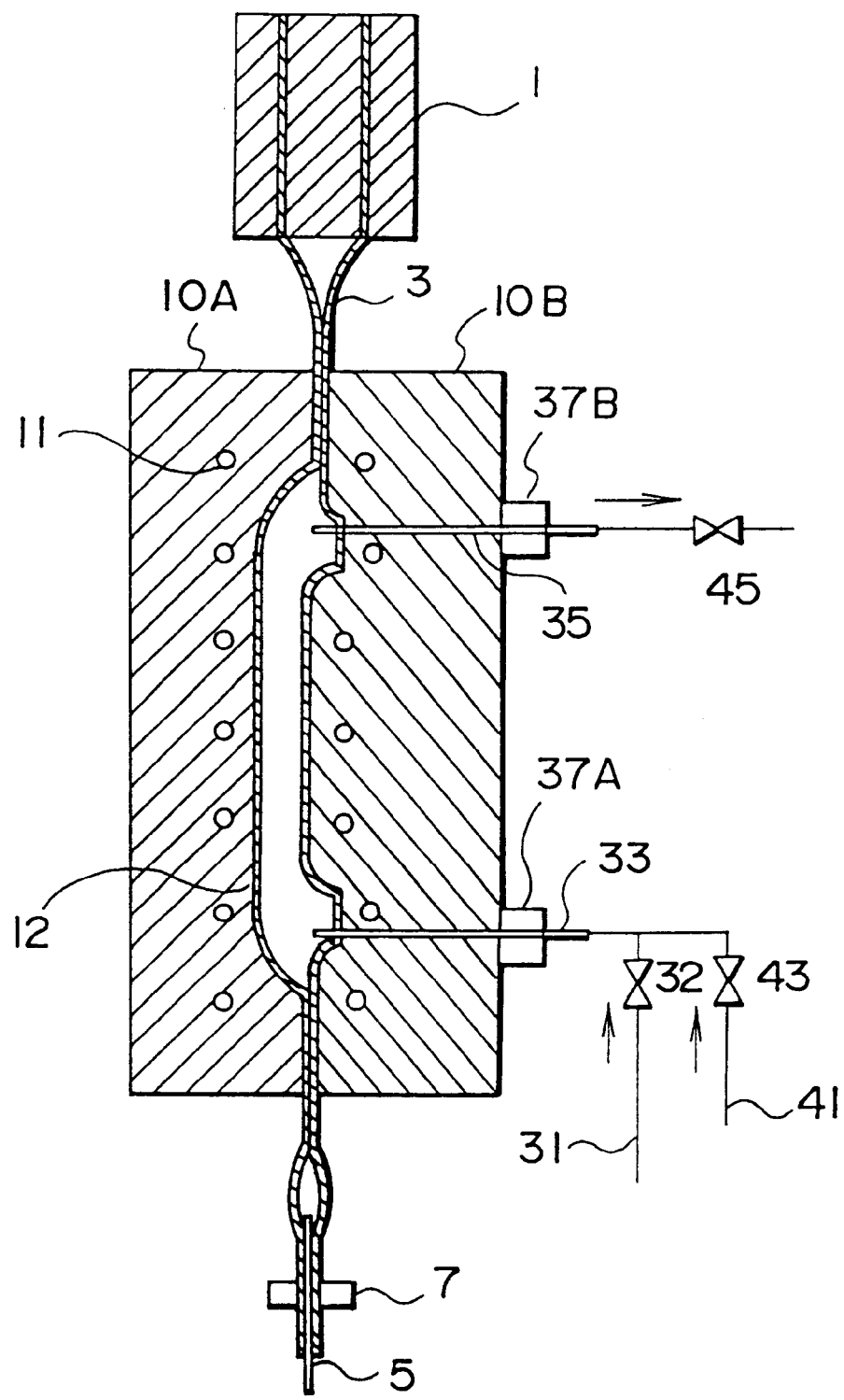

An example production method will next be described with reference to FIGS. 1 and 2. First, a crystalline resin is melt-extruded from an extruder. Typically, by use of an accumulator the crystalline resin is extruded through a die (1) into the space between opened molds (10A and 10B) which are used in combination, and is formed into a tubular parison (3). Subsequently, the lower end portion of the parison (3) is pre-pinched with a pinch (7) to prevent a blown-in fluid from escaping. Simultaneously, a fluid feeding pipe (5) for pre-blowing the parison is pinched. The parison is then expanded to a certain extent by pre-blowing, and, as shown in FIG. 2, is clamped by the set of molds whose mold inner surfaces (12) are regulated to have a certain temperature by a heating means (11). Subsequently, a conduit (33) of a pressurized fluid and a cooling medium is caused to penetrate through the wall of the parison by a thrusting apparatus (37A), and the pressurized fluid is blown via a pressurized fluid feeding path (31) and a valve (32) into the cavity of the parison so as to cause the parison to come into close contact with the mold inner surfaces (12). The fluid for blowing-in is not particularly limited. Generally, air at room temperature is used in consideration of mold transferability. In order to reduce the molding cycle time, there may be used a fluid of the same type as that used as a cooling medium for forced cooling of the interior of a blow molding as described below.

Subsequently, a discharge pipe (35) is inserted into the interior of the parison by use of a thrusting apparatus (37B). Next, the valve (32) of the pressurized fluid feeding path is shut, and a valve (43) of a cooling medium feeding path (41) is opened for introduction of the cooling medium into the interior of the parison. The interior of the parison is forcedly cooled through circulation and discharge of the cooling medium while the pressure of the cooling medium is regulated by a discharge valve (45) and the internal pressure is maintained. When cooling enables mold release of a blow molding, the molds are opened and the blow molding is removed. Timely mold-opening is achieved through measurement of the temperature of the discharged cooling medium or a like procedure. In this connection, cooling of molds is substantially unnecessary, but may be performed, as an auxiliary procedure, according to the size, shape, wall thickness, and like factors of molding.

Next will be described the production method of the present invention, including the temperature of mold inner surfaces and the method for cooling the interior of the parison.

First, when the parison is brought into close contact with the mold inner surfaces, the temperature of the mold inner surfaces is required to fall within the range from a temperature 10° C. lower than the crystallization temperature of the crystalline resin to the melting point of the crystalline resin. This temperature is not particularly limited so long as it falls within the above-mentioned range; however, when reduction in time of molding cycle is of particular interest, the temperature is regulated to fall within the range of crystallization temperature ±10° C., preferably the range from "crystallization temperature −5° C." to "crystallization temperature +10° C." An optimum temperature is selected within the above-mentioned ranges, in consideration of the degree of accuracy in mold transfer, conditions of mold inner surfaces (mirror surfaces, embossed surfaces, surfaces with patterns or characters), type of crystalline resin, resin temperature during molding, or size or wall thickness of the molding.

The heating method of the mold inner surfaces is not particularly limited, and there may be employed any method for heating the entirety of molds; for example, a method in which an ordinary heating medium such as water is circulated, or a method in which electrical heating such as resistance heating and dielectric heating is employed. Further, there may be used a method for heating selected portions of the mold inner surfaces, such as gas-flame heating. Alternatively, a combination of the above-mentioned methods may be used.

In the production method of the present invention, cooling of molds after the close contact between the molds and the parison is substantially unnecessary. Therefore, a specific mold structure, equipment, or control for temperature regulation in heating and cooling of molds can be eliminated, resulting in a simplified molding facility. However, if necessary, or as a supplementary procedure, after the parison is brought into close contact with mold inner surfaces, the molds may be cooled such that the mold inner surfaces come to have a temperature lower than that as measured when the parison comes into close contact with mold inner surfaces; for example, a temperature lower than the crystallization temperature of the crystalline resin, or a temperature 10° C. or more lower than the crystallization temperature of crystalline resin. In this case, there is preferably employed a method in which a cooling medium is circulated after purge of a heating medium.

Concerning heating of molds, so long as the mold inner surfaces are maintained at a specific temperature during transfer from the molds to the resin molding (i.e. when the resin molding is brought into close contact with the molds; hereinafter may be simply referred to as "upon close contact"), there may be preferably employed a mold structure having a small heat capacity, i.e., a mold structure in which the surface temperature changes considerably after the close contact takes place. In this case, the mold inner surface temperature may temporarily rise due to the heat from the melt resin. In such a case, even if the mold inner surface temperature is lower than the crystallization temperature of the crystalline resin, satisfactory transferability is secured. Therefore, the mold inner surface temperature is preferably set as low as possible, from the viewpoint of molding cycle time. However, the mold inner surface temperature upon close contact is required to fall within the range from a temperature 10° C. lower than the crystallization temperature of the crystalline resin to the crystallization temperature of the crystalline resin.

Such a mold structure is also effective for reducing time required for the mold inner surfaces to become ready for releasing the molded product by forced cooling of the interior of the parison after completion of the mold-to-resin transfer.

In other words, in the production method of the present invention, the mold inner surface temperature is maintained within a specific temperature range only upon close contact, and preferably, heat transfer from the molds to the molding should be avoided during subsequent cooling. For this purpose, there is advantageously employed a mold structure having a relatively thin metallic portion of the mold inner surfaces and comprising an air chamber for heat insulation or a heat insulating material.

As required, before die closing, the tip end of a parison is press-fused for sealing the parison, and a gas is pre-blown into the sealed parison so as to expand the parison or enlarge the diameter of the parison.

In the production method of the present invention, forced cooling of a blow molding is performed as follows: during or after blowing-in of a pressurized fluid, a cooling medium under pressure is introduced into the interior of the parison, and thereafter or simultaneously therewith, the heated medium in the parison is discharged through a discharge port provided at a place distant from an introduction port of the cooling medium. With this cooling method, the cooling medium is circulated within the interior of the parison, whereby effective cooling can be performed. The cooling medium is not particularly limited, and there may be used air, carbon dioxide gas, or nitrogen gas having a temperature of room temperature or lower. Preferably, air cooled to $-20°$ C. or less, more preferably $-30°$ C. or less, is used.

Generally, the pressure of the introduced cooling medium falls within the range so as to make the internal pressure of the parison 2–10 kg/cm$^2$, and may be selected as adequate according to the size and wall thickness of the product blow molding and the type of crystalline resin. In consideration of transferability of mold inner surfaces, reduction of molding cycle time, and like factors, the internal pressure of the parison at the early stage of coolant introduction is at a relatively high level; at least 4 kg/cm$^2$, preferably 4–10 kg/cm$^2$, more preferably 5–8 kg/cm$^2$.

Preferably, after transfer of the mold inner surfaces, as required for retention of the shape of a blow molding, the internal pressure of the parison is reduced below the pressure as measured at the beginning of introduction of a cooling medium; for example, lower than 4 kg/cm$^2$. Specifically, the internal pressure of the parison is maintained at 4–10 kg/cm$^2$, preferably 5–8 kg/cm$^2$, for a period of 10–30 seconds following introduction of the cooling medium, and thereafter is preferably lowered below the pressure as measured at the time of introduction of the cooling medium. Generally, the control of the internal pressure of the parison is performed through regulation of the amount of discharge while the amount of introduction is maintained constant; this control is important for reduction of molding cycle time achieved by a process in which the amount of discharge is increased after completion of mold-to-resin transfer so as to lower the internal pressure of the parison, to thereby increase the circulation amount and improve the cooling efficiency. Further, after completion of cooling of the parison, the control contributes to the reduction of time required for release of the internal pressure and further to reduction of the molding cycle time. The introduction and discharge of cooling medium are characterized in that the cooling medium introduced into the parison is caused to travel directionally (for example, in a single direction). Also, unlike the conventional circulating method limited to the interior of the parison, the parison is always cooled by fresh, low-temperature cooling medium. According to the size and shape of the molding, the conditions may be changed; for example, the introduction port and discharge port are alternated during cooling. Cooling from inside the parison enables very efficient cooling as compared with cooling of molds, as a result of a direct contact between the cooling medium with the inner surface of a parison, creation of a flow of the cooling medium (circulation and turbulence), and an increase in flow rate. For example, introduction of a cooling medium at $-30°$ C. provides a discharge gas of about 90° C.

In the present invention, forced cooling of the interior of the parison is generally performed as follows: a cooling medium introduction needle (pipe) provided in the wall of a mold is caused to move toward the parison and penetrate through the wall of the parison. The discharge needle (pipe) is similarly provided. The introduction needle (pipe) and the discharge needle (pipe) may be provided separately, or they may be formed into a double pipe. Generally, in order to enable the medium to flow within the blow molding so as to uniformly cool the entirety of the inner wall of the molding, the arrangement, location, number, and size of the introduction/discharge pipes are determined as adequate in consideration of the shape, etc. of the molding. In the present invention, the pipes are advantageously provided separately in consideration of cooling efficiency. Further, if necessary, there may be employed means which advances, retreats, or rotates (i.e., rotates a needle having an opening in the side surface) the cooling medium introduction needle inside the parison, or means which introduces the cooling medium intermittently.

In addition to the forced cooling of the interior of the parison, in the present invention degassing pores are advantageously provided in the mold inner surfaces, in order to reduce molding cycle time, attain more advanced improvement of the degree of close contact (transferability), or to provide even better appearance of moldings. The pores improve transcription of the portions where gases tend to remain, such as depressed portions having sharp curves. As a result, the surface conditions of a blow molding become excellent even if the molding has a complex structure.

Conventionally, pores having a diameter of about 0.2–0.5 mm have typically been employed as the degassing pores. However, the degassing pores in the present invention preferably have a diameter of 100 $\mu$m or less, more preferably 80 $\mu$m or less. If the diameter is in excess of 100 $\mu$m, a "hair" of resin (hair-shaped projections) may be generated on the surface of a molding. The possible lower limit of the diameter of degassing pores is about 10 $\mu$m, which is the limit of precise machining. The depth of degassing pores is generally 0.2–0.5 mm, and the pores may be formed through laser beam machining, electroforming, or like processing.

The pitch (interval) between degassing pores is preferably 50 mm or less, more preferably 30 mm, most preferably 20 mm. If the pitch is in excess of 50 mm, haze is generated on the surface of a molding due to insufficient degassing. The lower limit of the pitch is not particularly limited, and the pitch may be about 3 mm. However, since a smaller pitch increases the mold price, the pitch is determined as adequate in consideration of its potential effects on modification of the surface of the molding. The degassing pores are not required to be distributed uniformly on the entirety of mold inner surfaces, and are preferably formed at the portions such as depressions having sharp curves where intensive degassing is required.

Further, the mold inner surfaces may be machined to have a variety of surface conditions corresponding to the target molding product. Examples of the machining include mirror polishing to 0.5 S or less, embossing, pattern (or impression) machining, character/figure machining, and a combination thereof.

Next will be described cooling of the inner wall of a parison and mold release. Conventionally, in order to reduce the cycle time of molding, there has been employed a method of cooling a parison through regulation of the mold temperature to a temperature lower than the crystallization temperature of the crystalline resin, specifically at least about 30° C. lower than the crystallization temperature. With such a conventional cooling method, the parison is cooled mainly by the molds. In contrast, in the present invention, without cooling from the molds, crystallization of the inner wall of the parison efficiently proceeds through forced cooling from inside the parison. Therefore, since the molding can be shaped even when the apparent mold inner surface temperature is around the crystallization temperature, the molding can be released from the molds and removed.

Consequently, repetition of heating and cooling of molds as performed in conventional methods is eliminated, resulting in a reduction of the cycle time of molding. In addition, low-cost production is achieved in combination of simplification of manufacturing machinery and a temperature control method.

After the parison has been completely cooled, the supply of the cooling medium into the interior of the parison is stopped; the medium is discharged; the molds are opened; and the molding is removed.

As described above in detail, according to the method of producing blow moldings of the present invention, blow moldings having excellent surface gloss and appearance are produced at high productivity, due to the combination of means for enhancing transcription by use of a specific mold inner surface temperature and means to efficiently cool the blow moldings through forced cooling of the interior of a parison, and also due to the provision of specific degassing pores in the surfaces of the molds. Moreover, moldings having a relatively thick wall or large moldings can be produced in a reduced molding cycle at high productivity.

The production method of the present invention can be used to produce any type of known moldings which can be produced through blow molding. In the moldings, the resin layer may be either single-layered or multi-layered; however, in the case of multi-layered resin, the outermost layer must be made of a crystalline resin. The structure of the cavity of the molding may be determined arbitrarily, and the molding may have a plurality of cavity portions.

Next will be described a production apparatus of the present invention. The production apparatus of the present invention comprises a blow molding machine, molds having a specific structure, and means for introduction of a cooling medium into and discharge thereof from the interior of a parison.

The blow molding machine is not particularly limited, and a molding machine used in the "Examples" section of the present invention may be advantageously used.

The molds which are used in the production apparatus of the present invention produce blow moldings when used in combination with the blow molding machine. The molds have in the surfaces degassing pores having a diameter of 100 $\mu$m or less at a pitch of 50 mm or less. The diameter, pitch, and other factors of the degassing pores are as described above.

Means for introducing a cooling medium into a parison and discharging the medium therefrom may be provided in the die of the blow molding machine, through the mold wall, or both; however, the introduction means and discharge means must be provided separately. Generally, these means are an introduction needle (pipe) and a discharge needle (pipe). These needles (pipes) may be provided separately, or may be in the form of a double pipe. Generally, in order to enable the medium to flow within the blow molding so as to achieve substantially uniform cooling of the entirety of the inner wall of the molding, the arrangement, location, number, and size of the introduction/discharge needles (pipes) are determined as adequate in consideration of the shape, etc. of the product molding. In the present invention, the pipes are advantageously provided separately in consideration of cooling efficiency. Therefore, they are advantageously provided through the mold wall so as to obtain more freedom with respect to location.

If necessary, means for advancing and retracting the cooling medium introduction needles (pipes) may be provided, an opening may be formed in the side the introduction needles (pipes), and rotation means may be provided for the opening.

Further, in the case in which a low-temperature cooling medium is fed, a device for cooling the medium may be installed and arranged to communicate with the cooling medium introduction needles (pipes) via a pipe.

The present invention will next be described in more detail by way of examples and comparative examples, which should not be construed as limiting the invention thereto.

EXAMPLE 1

A blow molding was fabricated through blow molding performed under the following conditions.
1. Polypropylene resin composition serving as a raw material
1-1. Components of the composition
1-1-1. Polypropylene=65% by weight (product of Idemitsu Petrochemical Co., Ltd.; Idemitsu Polypro, E-100GM, MI: 0.6 g/10 min (230° C., 2.16 kgf)
1-1-2. High density polyethylene=10% by weight (product of Idemitsu Petrochemical Co., Ltd.; Idemitsu Polyethylene, 750LB, MI: 0.03 g/10 min (190° C., 2.16 kgf), density: 0.95 g/cm$^3$)
1-1-3. Ethylene-propylene copolymer elastomer=15% by weight (product of Japan Synthetic Rubber Co., Ltd.; EP07P, Mooney viscosity ML$_{1+4}$ (100° C.) : 77, ethylene content: 73% by weight)
1-1-4. Talc=10% by weight (mean grain size: 1.5 $\mu$m, mean aspect ratio: 15)
1-2. Preparation of composition: The composition was prepared through melt-kneading.
1-3. Properties of composition: The properties of the composition were measured as follows:
1-3-1. Crystallization temperature: 123° C.
1-3-2. Melting point: 164° C.

The crystallization temperature and the melting point were determined by use of a differential scanning calorimeter (DSC-7; manufactured by Perkin-Elmer) in accordance with JIS K7121. The resin composition was heated from room temperature at 10° C./min, and its melting point was measured. Subsequently, the composition was retained for 3 minutes at 230° C., and then cooled at 10° C./min, to thereby obtain its crystallization temperature.
2. Blow molding: Air spoiler for an automobile
2-1. Shape: Blow cylindrical shape (1,400 mm×200 mm×30 mm)
2-2. Weight of the product: Approximately 2.0 kg
3. Molding conditions
3-1. Molding machine: 90 mmØ blow molding machine (die: 100 mm in diameter, accumulator: 25 liters, clamping pressure: 60 tons, screw rotation: 40 rpm, motor load: 115A)
3-2. Molding temperature: cylinder: 230–190° C., crosshead: 190° C., die: 190° C., resin temperature: 220° C.

4. Molds 4-1. Heating means: The surface temperature was regulated to 128° C. through circulation of a heating oil (150 ° C).

4-2. Mold inner surface: Polished surface of 0.2 S having a large number of degassing pores having a diameter of 50 μm (pitch: 10 mm).

5. Molding method

A parison of the above-mentioned crystalline resin was fed to the space between a set of molds and clamped; dry air at −35° C. was blown into the parison through a cooling medium introduction needle formed through the wall of a mold so as to cause the parison to come into close contact with the mold inner surfaces; the introduction of the dry air was continued until the internal pressure of the parison reached 10 kg/m$^2$; 10 seconds later, the dry air was discharged from the parison through a cooling medium discharge needle formed through the wall of the mold so that the internal pressure of the parison became 3 kg/cm$^2$. The cooling medium introduction needle was provided in the mold so that it was positioned at a location 20 mm from one edge of the back side of an air spoiler (the side which serves as the back side when the air spoiler is attached to an automobile), whereas the cooling medium discharge needle was provided in the mold so that it was positioned at a location 20 mm from the other edge of the spoiler, so as to cause the cooling medium to flow in a single direction.

At the initial stage of the cooling of the parison, the temperature of the discharged air was 90° C. When the temperature of the discharged air dropped to 40° C., the introduction of the dry air was terminated; the remaining air within the parison was discharged; the molds were opened; and a molding was removed from the molds.

6. Evaluation of blow molding 6-1. Surface gloss of product: The surface gloss was measured under the conditions of incidence angle=60° and light interception angle=60° in accordance with JIS K7105. The surface gloss was found to be 95%.

6-2. "Hair" on the mold inner surface: Presence or absence of hair was visually checked, and no generation of hair was found.

6-3. Haze in the mold inner surface: The haze was evaluated according to the following criteria.

A: No haze

B: Difficult to visually determine

C: Visually observed (partially)

The rank was found to be A.

7. Evaluation of molding cycle

An average cycle time of molding was obtained from ten cycles of producing moldings; the cycle time is defined from the viewpoint of time at which a molding is removed from the molds to the point of time at which the molding is removed from the molds in the subsequent molding cycle. The average molding cycle time was found to be 210 seconds.

As shown by the above-mentioned evaluation results, blow moldings having excellent surface conditions were confirmed to be produced by the production method of the present invention. Further, the molding cycle time is comparable with those shown in Examples 3–7 below, which indicates that intentional and intensive cooling of the mold temperature is not always necessary.

EXAMPLE 2

The procedure of Example 1 was repeated to produce a blow molding, except that the following conditions were used.

1. Blow molding: Wheel cap 1-1-1. Shape=diameter: 400 mm, with seven through holes along the periphery, wall thickness: 3–4 mm 1-1-2. Weight of the product: Approximately 550 g 2. Molding conditions 2-1. Molding machine: 90 mmØ blow molding machine (die: 160 mm in diameter, accumulator: 15 liters, clamping pressure: 60 tons, screw rotation: 40 rpm, motor load: 115A)

2-2. Molding temperature: cylinder: 230–190° C., crosshead: 210° C., die: 210° C., resin temperature: 220° C.

3. Mold 3-1. Mold inner surface temperature: The temperature was regulated to 120° C.

4. Molding method

A parison was fed to the space between a set of molds and clamped; dry air of room temperature was blown into a portion within the parison corresponding to the central portion of a molding (wheel cap) via a pressurized fluid introduction needle formed through the wall of a mold so as to cause the parison come into close contact with the mold inner surfaces; the introduction of the dry air was terminated; dry air at −35° C. was blown into three portions within the parison corresponding to the peripheral portions of the molding via cooling medium introduction needles formed through the wall of the mold until the internal pressure of the parison reached 7 kg/cm$^2$; and the cooling medium was discharged from the parison through the same pressurized fluid introduction needle, through which the above-mentioned dry air of room temperature had been previously blown into the parison, while the internal pressure of the parison was maintained at 3.5 kg/cm$^2$ (with this procedure, the cooling medium was caused to flow from the peripheral portions to the central portion of the molding); 170 seconds later, the introduction of the −35° C. dry air was terminated; the pressure within the parison was released; the molds were opened; and the molding was removed from the molds.

5. Evaluation of blow molding

The blow molding was evaluated in the same manner as in Example 1. The results include a surface gloss of 95%, no generation of "hair," and grade A evaluation with respect to haze.

EXAMPLES 3–7 and

Comparative Examples 1–5

Blow moldings were fabricated in a manner similar to that described in Example 1, but by use of the following conditions.

1. Mold 1-1. Heating means and cooling means: The surface temperature was regulated through circulation of a heating oil (150° C.) and a cooling oil (60° C.). The details the temperature regulation are shown in Table 1. The circulation of the heating oil and the cooling oil was performed via a common pipe, and, in this cooling method, fresh oil was fed after complete purging of the old oil.

1-2. Mold inner surfaces: Polished surface of 0.2 S having degassing pores whose diameter and pitch are as shown in Table 1.

2. Molding method

The molding method employed in Examples 3–7 was same as in Example 1 except that the steps of heating and cooling of molds were additionally performed as follows. Briefly, the molds were heated until clamping which followed mold opening and feeding of a parison. Subsequently, the molds were cooled until a molding was removed.

In Comparative Examples 1–5, molding was performed without provision of a cooling medium discharge needle.

3. Evaluation of molding and molding cycle 3-1. Shape retainability at the time when the molded product is released: The shape retainability was visually evaluated according to the following criteria.

A: Deformation was not visually observed

B: Deformation that may adversely affect the product was not observed

C: A slight deformation was partially observed

D: Considerable distortion was observed

The results are shown in Table 1.

The surface gloss, presence and absence of "hair," haze, and molding cycle time were investigated in the same manner as in Example 1. The results are also shown in Table 1.

The results of evaluation showed that the products and methods of Examples 3–5 are excellent in every respect. Those of Examples 6 and 7 are excellent in terms of gloss and molding cycle time; however, they were second to Examples 3–5 with respect to haze in the surface. In contrast, none of Comparative Examples provided a satisfactory level of gloss and excellent molding cycle time at the same time.

TABLE 1

|  | Mold temperature upon contact of parison (° C.) | Mold temperature upon removal of molding (° C.) | Dye: degassing pores | | Forced cooling inside parison? | Shape retainability when molding is removed |
|---|---|---|---|---|---|---|
|  |  |  | Diameter (μm) | Pitch (mm) |  |  |
| Ex. 3 | 130 | 110 | 50 | 5 | Yes | B |
| Ex. 4 | 130 | 100 | 50 | 5 | Yes | B |
| Ex. 5 | 130 | 100 | 50 | 10 | Yes | B |
| Ex. 6 | 130 | 100 | 50 | 50 | Yes | B |
| Ex. 7 | 130 | 100 | 100 | 50 | Yes | B |
| Comp. Ex. 1 | 60 | 60 | 50 | 5 | No | A |
| Comp. Ex. 2 | 120 | 60 | 50 | 5 | No | A |
| Comp. Ex. 3 | 130 | 60 | 50 | 5 | No | A |
| Comp. Ex. 4 | 130 | 80 | 50 | 5 | No | A |
| Comp. Ex. 5 | 130 | 100 | 50 | 5 | No | D |

|  | Surface gloss of molding (%) | "Hair" on the surface of molding | Haze in the surface of molding | Molding cycle (sec) | | |
|---|---|---|---|---|---|---|
|  |  |  |  | Heating | Cooling | Total |
| Ex. 3 | 95 | None | A | 60 | 180 | 240 |
| Ex. 4 | 95 | None | A | 120 | 180 | 300 |
| Ex. 5 | 95 | None | B | 120 | 180 | 300 |
| Ex. 6 | 95 | None | C | 120 | 180 | 300 |
| Ex. 7 | 95 | Slight | C | 120 | 180 | 300 |
| Comp. Ex. 1 | 20 | None | A | 0 | 120 | 150 |
| Comp. Ex. 2 | 65 | None | A | >240 | >500 | >780 |
| Comp. Ex. 3 | 90 | None | A | >240 | >500 | >780 |
| Comp. Ex. 4 | 95 | None | A | >240 | >500 | >780 |
| Comp. Ex. 5 | — | — | — | — | — | — |

INDUSTRIAL APPLICABILITY

Blow moldings produced through the production method or the apparatus of the present invention realize excellent mold transferability and, notwithstanding the method being a variation of blow molding, the blow moldings are provided with a high surface gloss of 90% or more. Also, despite a high level of glossiness of the blow moldings, the production method and apparatus excellently reduces the molding cycle time and provide satisfactory product quality and productivity. Further, production facilities as well as control of molding are simplified since heating and cooling cycles for the molds are substantially eliminated. In addition, since a high surface gloss is advantageously obtained, products requiring no secondary coating can be produced. Therefore, the production method and apparatus are applicable to manufacture of a broad range of products such as automobile parts, furniture, and bath/lavatory utensils.

What is claimed is:

1. A method of producing a blow molded article, comprising:

feeding a melt parison of a crystalline resin into the space between molds;

clamping the molds;

blowing a pressurized fluid into the interior of the parison so as to cause the parison to come into close contact with an inner surface of the molds and to solidify the parison;

wherein, while the parison and the inner surface of the molds are in close contact, a temperature of an inner surface of the molds is maintained within the range from a temperature 10° C. lower than a crystallization temperature of the crystalline resin to a melting point of the crystalline resin;

cooling the parison through introduction or discharge of a cooling medium having a temperature not higher than room temperature;

wherein said introduction or said discharge occur during or after blowing-in of the pressurized fluid;

wherein introduction and discharge of the cooling medium are performed through an introduction port and a discharge port, respectively, which are provided at locations remote from each other; and removing the molded article from the molds.

2. The method according to claim 1, wherein the molds have degassing pores having a diameter of 100 μm or less in the surfaces of the molds at intervals of 50 mm or less.

3. The method according to claim 1, wherein the temperature of the inner surface of the molds falls within the crystallization temperature of the crystalline resin ±10° C. when the parison and the inner surface of the molds are in close contact.

4. The method according to claim 1, wherein the cooling medium is air.

5. The method according to claim 1, wherein an internal pressure of the parison as measured at the beginning of introduction of the cooling medium is at least 4 kg/cm$^2$; and wherein subsequently, the internal pressure of the parison is reduced to a level lower than that as measured at the beginning of introduction of the cooling medium.

6. The method according to claim 1, wherein the molds are cooled by use of a cooling medium after the parison has been brought into close contact with the molds.

7. The method according to claim 1, wherein the crystalline resin is a polypropylene resin.

8. The method according to claim 2, wherein the temperature of the mold inner surfaces falls within the crystallization temperature of the crystalline resin ±10° C. when the parison and the mold inner surfaces are in close contact.

9. The method according to claim 2, wherein the cooling medium is air.

10. The method according to claim 2, wherein the internal pressure of the parison as measured at the beginning of introduction of the cooling medium is at least 4 kg/cm$^2$; and wherein subsequently, the internal pressure of the parison is reduced to a level lower than that as measured at the beginning of introduction of the cooling medium.

11. The method according to claim 2, wherein the molds are cooled by use of a cooling means after the parison has been brought into close contact with the molds.

12. The method according to claim 2, wherein the crystalline resin is a polypropylene resin.

13. An apparatus for the production of a blow molded article, comprising:

a blow molding machine;

a forming mold which is used in combination with the blow molding machine for producing the blow molded article;

wherein the forming mold has degassing pores having a diameter of 100 $\mu$m or less in a surface of the mold at intervals of 50 mm or less; and an introducing pipe and a discharge pipe for introducing or discharging a cooling medium into or from a parison formed through the mold;

wherein said introducing pipe is movable and is connected to a first thrusting apparatus and said discharge pipe is movable and is connected to a second thrusting apparatus;

wherein said introducing pipe is connected to a pressurized fluid feeding path having a valve and to a cooling medium path having a valve.

14. The apparatus according to the claim 13, wherein said introduction pipe and said discharge pipe are provided at locations remote from each other.

15. The apparatus according to the claim 13, wherein said blow molding machine has a diameter of 90 mm.

16. The apparatus according to the claim 13, wherein said blow molding machine comprises a die having a diameter of from 100 to 160 mm and an accumulator having a volume of from 15 to 25 liters.

* * * * *